US012548170B2

(12) United States Patent
Metge et al.

(10) Patent No.: US 12,548,170 B2
(45) Date of Patent: Feb. 10, 2026

(54) METHOD, DEVICE AND SYSTEM FOR REAL-TIME MULTI-CAMERA TRACKING OF A TARGET OBJECT

(71) Applicant: BULL SAS, Les Clayes-sous-Bois (FR)

(72) Inventors: Baptiste Metge, Grenoble (FR); Benoît Pelletier, Saint Etienne de Crossey (FR); Cécile Boukamel-Donnou, Echirolles (FR); Genc Tato, Paris (FR); Maha Alsayasneh, Grenoble (FR); Nicolas Arnaise, Bourgoin Jallieu (FR); Vincent Giraud, Meylan (FR)

(73) Assignee: BULL SAS, Les Clayes-sous-Bois (FR)

( * ) Notice: Subject to any disclaimer, the term of this patent is extended or adjusted under 35 U.S.C. 154(b) by 451 days.

(21) Appl. No.: 18/175,780

(22) Filed: Feb. 28, 2023

(65) Prior Publication Data
US 2023/0274448 A1    Aug. 31, 2023

(51) Int. Cl.
G06T 7/246      (2017.01)
G06T 7/292      (2017.01)

(52) U.S. Cl.
CPC ............. G06T 7/248 (2017.01); G06T 7/292 (2017.01); G06T 2207/30196 (2013.01)

(58) Field of Classification Search
CPC ......... G06T 7/246; G06T 7/248; G06T 7/292; G06T 2207/30196
See application file for complete search history.

(56) References Cited

U.S. PATENT DOCUMENTS

| | | | |
|---|---|---|---|
| 8,243,990 B2 * | 8/2012 | Huang | G06T 7/251 382/103 |
| 11,836,981 B2 * | 12/2023 | Pelletier | G06V 10/56 |
| 12,190,588 B2 * | 1/2025 | Chen | G06N 3/0464 |
| 2014/0098989 A1 * | 4/2014 | Datta | G06T 7/248 382/103 |
| 2015/0104066 A1 * | 4/2015 | Shellshear | G06T 7/277 382/103 |
| 2021/0182532 A1 * | 6/2021 | Arnaise | G06V 10/82 |
| 2022/0004768 A1 | 1/2022 | Pelletier | |
| 2023/0074123 A1 * | 3/2023 | Celi | G06T 7/248 |

OTHER PUBLICATIONS

European Search Report and Written Opinion issued in EP22305220.0 dated Aug. 16, 2023 (7 pages).

* cited by examiner

Primary Examiner — Stephen R Koziol
Assistant Examiner — Benedict E Lee
(74) Attorney, Agent, or Firm — ARC IP Law, PC; Joseph J. Mayo

(57) ABSTRACT

The invention relates to a method for real-time multi-camera tracking of a target object comprising, for at least one new tracklet captured by at least one camera, calculating at least a first distance between the new tracklet and at least one reference tracklet belonging to the target object. The method also includes, when the smallest calculated first distance is between a first predetermined threshold value, called re-identification threshold, and a second predetermined threshold value, called human threshold, presenting the new tracklet to an operator, for the operator to assign or not assign the new tracklet to the target object, manually. The human threshold is a function of the number of reference tracklets in the reference list. The invention also relates to a computer program, to an object re-identification device and to an object re-identification system implementing such a method.

20 Claims, 4 Drawing Sheets

METHOD, DEVICE AND SYSTEM FOR REAL-TIME MULTI-CAMERA TRACKING OF A TARGET OBJECT

BACKGROUND OF THE INVENTION

Field of the Invention

At least one embodiment of the invention relates to a method for real-time multi-camera tracking of a target object. It also relates to a computer program, to a device, and to a system implementing such a method.

The field of one or more embodiments of the invention is generally the field of tracking objects from images captured by cameras.

DESCRIPTION OF THE RELATED ART

Cities are increasingly equipped with video surveillance cameras of which the number is increasing faster than the number of human operators. It is very difficult to track a target object, such as a person or a vehicle, moving from camera to camera. If the operator is disrupted, he/she can lose the target object, and finding it again can be particularly tedious. The tracking of a plurality of target objects at a time is even more difficult. Tracking a target object on images provided by a plurality of cameras is also called multi-camera tracking.

Multi-camera tracking solutions based on deep learning models and in particular re-identification models are known. These solutions suffer from a significant drop in performance on real data, i.e., on images under usage conditions. This phenomenon is referenced in the state of the art under the term "domain drift." This drop in performance has the effect of inducing a significant rate of false positives and false negatives in the recognition of the objects, so it is necessary to have a very large number of interactions with the operator to validate or invalidate the re-identification proposals made by the tracking solution, which requires even more human operators.

One aim of one or more embodiments of the invention is to solve at least one of the drawbacks of the state of the art.

Another object of one or more embodiments of the invention is to propose a more efficient multi-camera tracking solution.

Another object of one or more embodiments of the invention is to propose a multi-camera tracking solution that reduces interaction with human operators.

BRIEF SUMMARY OF THE INVENTION

At least one embodiment of the invention proposes to achieve at least one of the aforementioned aims by a method for real-time multi-camera tracking of a target object, from a list, called reference list, comprising at least one tracklet, called reference tracklet, belonging to said target object, said method comprising a tracking phase carried out for at least one new tracklet captured by at least one of the cameras, said tracking phase comprising the following steps:
  calculating at least a first distance between said new tracklet and at least one reference tracklet;
  when the smallest calculated first distance is between a first predetermined threshold, called re-identification threshold, and a second predetermined threshold, called human threshold, greater than said re-identification threshold, presenting said new tracklet to an operator, for said operator to assign or not assign said new tracklet to said target object, manually;
wherein the human threshold is a function of the number of reference tracklets in said reference list.

Thus, at least one embodiment of the invention proposes to determine, and in particular to adjust, the value of the human threshold as a function of the number of reference tracklets used for tracking the target object. For example, it is possible to decrease the value of the human threshold when the number of reference tracklets in the reference list increases. Alternatively, or in addition, it is possible to increase the value of the human threshold when the number of reference tracklets is small. Generally, the value of the human threshold can be adjusted in a manner inversely proportional to the number of reference tracklets in the reference list.

The use of a larger number of reference tracklets makes it possible to reduce the human threshold from which validation by the operator is requested. The decrease in the human threshold makes it possible to reduce the number of times the human operator is called upon during the tracking of the target object, thus reducing interaction with the human operator.

In addition, the use of a larger number of reference tracklets makes it possible to increase the tracking performance, by reducing the number of false positives and the number of false negatives.

In at least one embodiment, "object" or "target object" means any type of object, such as a human, an animal, a car, etc.

In at least one embodiment, "tracklet" means a set of at least one image, or image zone, belonging to the same object and captured by a camera.

In at least one embodiment, "past tracklet" means a tracklet stored by a camera prior to the tracking phase.

In at least one embodiment, "new tracklet" means a tracklet stored by a camera during the tracking phase, that is to say after the triggering of the tracking phase.

The distance between two tracklets may be a Euclidean distance or a cosine distance.

The distance between two tracklets can be calculated according to any known technique. According to a first example in one or more embodiments, and in no way limiting, the distance between two tracklets can be determined as a function of the individual distances between each of the images forming one of the tracklets and each of the images forming the other of the tracklets, then by calculating an aggregate distance as a function of said individual distances, for example by averaging the individual distances. Alternatively, for a tracklet, it is possible to calculate an aggregate signature for a tracklet, for example as being an average of the signatures of each image of said tracklet. The distance between two tracklets can then correspond to the distance between the aggregate signatures of the two tracklets.

In a known manner, the distance between two images can be calculated by generating a digital signature for each of the images, for example by an intelligent model such as a neural network, then by calculating the distance between these two digital signatures.

"Camera" means any type of image acquisition apparatus, such as any type of RGB, LIDAR, thermal, or 3D camera, etc.

At least one reference tracklet in the reference list at the start of the method can be selected by the operator.

Alternatively, or in addition, at least one reference tracklet in the reference list at the start of the method can be selected/detected automatically, without intervention from the operator. For example, at least one reference tracklet in the reference list at the start of the method can be detected following an alarm. In this case, the target object and therefore the reference tracklet, can be identified in an automated manner, for example in the data associated with the alarm, which makes it possible to automatically activate tracking, without intervention by an operator.

According to one or more embodiments, when the smallest calculated first distance is less than the re-identification threshold, the tracking phase may comprise an automatic assignment of the new tracklet to the target object.

Indeed, in this case, the object on the new tracklet is judged sufficiently similar to the target object so that it is considered that the object on said new tracklet is the target object, without having to call on the operator.

According to at least one embodiment, when a new tracklet is assigned to the target object during the tracking phase, said tracking phase may further comprise a step of adding said new tracklet as a reference tracklet in said reference list.

Thus, at least one embodiment of the invention makes it possible to increase the number of reference tracklets in the reference list, which reduces the value of the human threshold and reduces interaction with, and solicitation of, the operator.

The assignment of the new tracklet to the target object can be carried out in an automated or manual manner, as described above.

According to at least one embodiment of the invention, the method may comprise, before the tracking phase, a prior phase of enriching the reference list, by adding at least one additional reference tracklet in said reference list, chosen from a past tracklet database acquired during a predetermined period preceding the triggering of the tracking phase.

For example, the operator can choose a reference tracklet corresponding to the target object being tracked. This reference tracklet chosen by the operator can be used to identify other reference tracklets corresponding to the object and acquired during a past period, immediately preceding the triggering of the tracking of the target object.

Thus, it is possible to increase the number of reference tracklets before starting the tracking of the target object. As indicated above, the increase in the number of reference tracklets makes it possible on the one hand to increase the performance of the tracking, and on the other hand to reduce the value of the human threshold and consequently the interaction with the operator during tracking.

The predetermined period may correspond to a period of 30 minutes, or one hour, immediately preceding the tracking phase. This period may be adjustable or adjusted by the operator.

According to one or more embodiments, the prior phase of enriching the reference list may comprise at least one iteration of the following steps carried out for a past tracklet:
  calculating at least one distance between:
    a reference tracklet of said reference list, and
    said past tracklet,
  adding, or not, said past tracklet as an additional reference tracklet in said reference list as a function of:
    said at least one calculated distance, and
    the re-identification threshold and/or the human threshold.

Thus, at least one embodiment of the invention proposes to identify new reference tracklets from past tracklets as a function of the distance between the reference tracklet(s) and each past tracklet.

According to one or more embodiments, for at least past tracklet, when at least one calculated distance is less than the re-identification threshold, then the past tracklet is added as the reference tracklet in the reference list.

Alternatively or in addition, for at least one past tracklet, when the smallest of the calculated distances is between the re-identification threshold and the human threshold, then the past tracklet is presented to the operator.

If the operator validates the past tracklet as belonging to the target object, then said past tracklet is added as the reference tracklet in the reference list. Otherwise, the past tracklet is ignored.

According to at least one embodiment, the method may comprise updating the value of the human threshold in the event a reference tracklet is added to said reference list.

For example, this updating step can be carried out each time a reference tracklet is added in the reference list, automatically and/or manually after validation by the operator, during the tracking phase and/or during the prior phase.

The value of the human threshold can be calculated by the following relationship:

$$SH = SH_i - \{NBTR \times PA\}$$

where:
  SH is the value of the human threshold,
  $SH_i$ is the initial value of the human threshold, chosen at the start of the method according to one or more embodiments of the invention
  NBTR is the number of reference tracklets in the reference list,
  PA is a predefined training value.

The training value PA can be defined as a function of a maximum number, $NB_{max}$, of reference tracklets in the reference list.

Alternatively, or in addition, the training value PA may be defined as a function of a total training value, denoted D. For example:

$$D \leq (SH_i - SR), \text{ where SR is the re-identification threshold.}$$

According to at least one embodiment, the training value PA can be calculated according to the following relationship:

$$PA = D/NB_{MAX}$$

According to at least one embodiment:

$$D = SH_i - SR.$$

In this case, the value of the human threshold can be calculated with the following relationship:

$$SH_n = SH_i - \left\{ NBTR \times \left( \frac{SH_i - SR}{NB_{max}} \right) \right\}$$

In this case, when the number of reference tracklets NBTR in the reference list increases, the value of the human threshold SH gradually approaches the value of the re-identification threshold SR, thus reducing requests to the operator during the tracking phase.

Above all, when the number NBTR of reference tracklets in the reference list is equal to the maximum number of reference tracklets $NB_{max}$ then SH=SR, such that the re-identification will be done in an entirely automated manner without any requests to the operator.

According one or more embodiments, the method may further comprise an adjustment of the human threshold, and/or of the re-identification threshold, as a function of at least one characteristic of a scene observed by a camera.

Such a characteristic may for example be the brightness of the scene. For example, it is possible to determine the brightness of a scene as a function of the brightness of a tracklet or else of the brightness of the images taken by the camera observing said scene. In particular, the human threshold can be adjusted downward when the brightness of the scene increases, and upward when the brightness of the scene decreases.

Such a characteristic may for example be the number of objects in the scene, and more generally the complexity of the scene. For example, it is possible to determine the number of objects in a scene by counting the number of objects in an image taken by the camera observing said scene. The detection of the number of objects in an image can be carried out by any known technique, for example by using the YOLOv5 algorithm. In particular, the human threshold can be adjusted downward when the number of objects in the scene decreases, and upward when the number of objects in the scene increases.

According to at least one embodiment, the step of presenting a tracklet to the operator can be carried out according to at least one predetermined rule based on at least one of the following parameters:
   number of tracklets, denoted NTP, to be presented to the operator at one time,
   elapsed time, DUR, since the last iteration of the presentation step, and/or
   number, NMT, of best matches.

In particular, the number of tracklets to be presented may correspond to the total number of tracklets to be presented to the operator. In this case, each tracklet that meets the human threshold (but not the re-identification threshold) is stored in a list of tracklets to be presented to the operator. As soon as the number of tracklets in this list reaches the number NTP, then the presentation step can be carried out. According to at least one embodiment, NTP=10.

Alternatively, in one or more embodiments, the number NTP can correspond to the maximum number of tracklets to be presented to the operator. In this case, even if the number NTP is not reached, for example due to a small number of new tracklets, then the tracklets can be presented to the operator when the time DUR is reached.

In particular, the elapsed time DUR from the last iteration may correspond to the minimum time to wait between two iterations of the presentation step. According to at least one embodiment, DUR=10 minutes.

The number of best matches NMT may be the number of tracklets that have the first smallest distance to the reference tracklets. In this case, only these tracklets are presented to the operator during the presentation step. According to a non-limiting embodiment NMT=3.

For example, when NTP=10 and NMT=3, then the tracking phase is carried out without the presentation step until there are at least 10 tracklets in the tracklet list to be presented to the operator. Once the list comprises 10 tracklets, the presentation step is carried out. During this presentation step, only the three tracklets which have the best scores, that is to say the smallest first distances to the reference tracklets, are presented to the operator. The other tracklets are ignored.

According to one or more embodiments, the validation, or not, by the operator for a first tracklet can be used to validate or not validate a second tracklet according to said first tracklet, such that said second tracklet is not presented to the operator.

For example, the first and second tracklets can be obtained by the same camera in a very short time lapse.

The first and second tracklets can be obtained by dividing a source tracklet into multiple fragments due to occlusion, for example. In this case, the two fragments can be very similar and the user's response to one of the fragments can probably be used for the other.

When the user has not yet been queried on the first tracklet, or has not yet taken a position on the first tracklet, the second tracklet can be placed in a list while waiting for the first tracklet to be validated or not. Then, when the operator has made a decision concerning the first tracklet, validation or rejection of the first tracklet, the same decision is applied to the second tracklet, validation or rejection of the second tracklet.

The tracking phase may further comprise a step of storing the new tracklet in a list, referred to as the rejected tracklet list, when said new tracklet is not assigned to the target object.

The new tracklet may be rejected when the smallest first distance is greater than the human threshold.

The new tracklet can be rejected when the smallest first distance is between the human threshold and the re-identification threshold but rejected following a decision of the operator during the interrogation step.

The list of rejected tracklets may comprise all the rejected tracklets. Alternatively, the list of rejected tracklets may comprise only a predetermined number of the most recently rejected tracklets. According to at least one embodiment, the list of rejected tracklets can comprise only the tracklets rejected during a time window, of a predetermined duration, for example of minutes, preceding the current moment.

According to one or more embodiments, the tracking phase may further comprise, before the step of presenting the new tracklet to the operator, a test step comprising the following steps:
   calculating at least one second distance between the new tracklet and at least one previously rejected tracklet, and
   rejecting said new tracklet as not belonging to the target object when:
      the smallest first distance is greater than the smallest second distance, and
      the smallest second distance is less than a predetermined threshold, referred to as the similarity threshold;

Thus, the method according to at least one embodiment of the invention makes it possible to automatically reject a new tracklet as not belonging to the target object, when said new tracklet has a significant similarity with at least one previously rejected tracklet. Thus, this new tracklet is not presented to the operator, which reduces the requests to the operator.

A new tracklet thus rejected can be stored in the list of rejected tracklets.

The similarity threshold may be of fixed value. The similarity threshold can be fixed at the start of the method according to one or more embodiments of the invention.

It may happen that the operator rejects too many tracklets. This may be a sign that the value of the human threshold SH is too high and there are too many false positives being presented to the operator. In this case, the method according to one or more embodiments of the invention may comprise a step for readjusting, and in particular reducing, the value of the human threshold by a predetermined readjustment value.

The readjustment step may be the same as, or different from, the training value described above.

The readjustment value may be a fixed value, or a variable value, for example as a function of a number of tracklets rejected by the operator.

The step of readjusting the human threshold value SH can for example be triggered when the number of tracklets rejected in a predetermined, in particular sliding, time window reaches a predetermined threshold value.

According to at least one embodiment of the invention, a computer program is proposed comprising executable instructions, which, when they are executed by a computing apparatus, implement all the steps of the method according to one or more embodiments of the invention for real-time multi-camera tracking of a target object.

The computer program can be in any computer language, such as, for example, in machine language, in C, C++, JAVA, Python, etc.

According to at least one embodiment of the invention, a device is proposed for the real-time multi-camera tracking of a target object comprising means configured to implement all the steps of the method, according to one or more embodiments of the invention, for real-time multi-camera tracking of a target object.

The device according to at least one embodiment of the invention can be any type of apparatus such as a server, a computer, a tablet, a calculator, a processor, a computer chip, programmed to implement the method according to one or more embodiments of the invention, for example by the computer program according to at least one embodiment of the invention.

According to one or more embodiments of the invention, a system for real-time multi-camera tracking of a target object is proposed, comprising:
  a plurality of cameras, and
  a device according to at least one embodiment of the invention for real-time multi-camera tracking of a target object from images provided by said cameras.

At least one of the cameras may be local or remote from the device. In the latter case, the camera can be in communication with the device through a wired or wireless communication network, such as for example the Internet.

The cameras can be distributed in space, for example within a place, such as a train station or an airport, or in a city, or even along a traffic lane.

BRIEF DESCRIPTION OF THE DRAWINGS

Other benefits and features shall become evident upon examining the detailed description of one or more embodiments, and from the enclosed drawings in which.

DETAILED DESCRIPTION OF THE INVENTION

It is clearly understood that the one or more embodiments that will be described hereafter are by no means limiting. In particular, it is possible to imagine variants of the at least one embodiment of the invention that comprise only a selection of the features described hereinafter in isolation from the other features described if this selection of features is sufficient to confer a technical benefit or to differentiate the one or more embodiments of the invention with respect to the prior art. This selection comprises at least one preferably functional feature which is free of structural details, or only has a portion of the structural details if this portion alone is sufficient to confer a technical benefit or to differentiate the at least one embodiment of the invention with respect to the prior art.

In particular, all of the described variants and embodiments can be combined with each other if there is no technical obstacle to this combination.

In the figures and in the remainder of the description, the same reference has been used for the features that are common to several figures.

Figure 1:
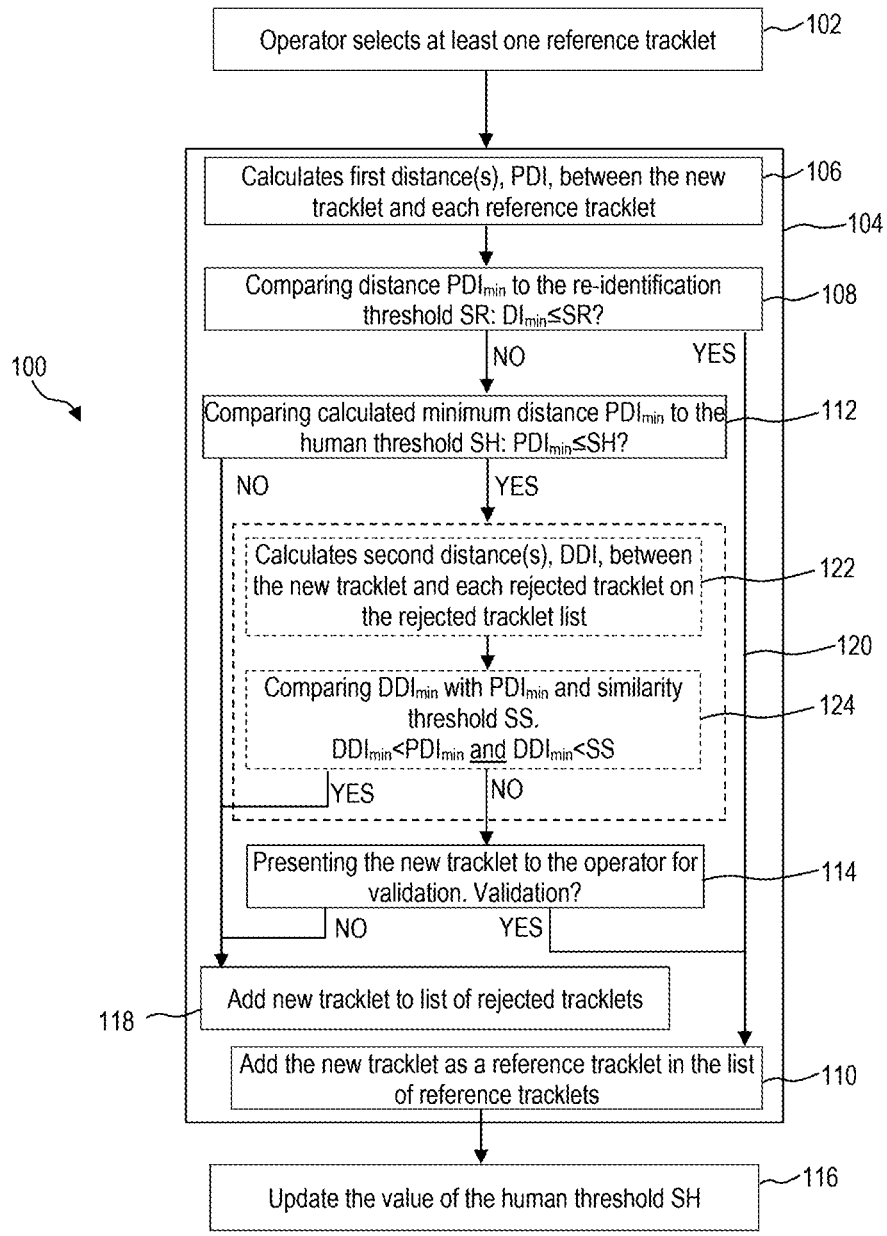
FIG. 1 is a schematic depiction of a method according to one or more embodiments of the invention.

FIG. 1 is a schematic depiction of a method according to one or more embodiments of the invention.

The method 100 of FIG. 1 can be used to track any type of target objects, such as humans, animals, cars, etc. from images coming from a plurality of cameras distributed in space.

Hereinafter, and without loss of generality, it is assumed that the method is used for tracking a target person.

The method 100 comprises a step 102 of an operator selecting at least one reference tracklet corresponding to the target person to be tracked. Preferably, but in a non-limiting manner, each reference tracklet is obtained from images from one of the cameras captured prior to tracking. Each reference tracklet is stored in a reference tracklet list, called reference list.

The method 100 then comprises a phase 104 for tracking the target person from images from the cameras.

During the tracking phase 104, each new tracklet, coming from each camera, and corresponding to a person, is analyzed to determine whether said new tracklet corresponds to the target person or not. To do this, the tracking phase 104 comprises a step 106 during which a distance, cosine or Euclidean, called first distance, between each reference tracklet and the new tracklet is determined. Thus, during step 106, for the new tracklet, as many first distances are determined as there are reference tracklets in the reference list. Among these first distances, only the smallest first distance, denoted $PDI_{min}$, is retained. Alternatively, it is possible to retain the average of the first calculated distances.

During a step 108, the smallest first calculated distance $PDI_{min}$ 108 is compared to a predetermined re-identification, SR, threshold. For example SR=0.1.

If $PDI_{min} \leq SR$, then the new tracklet is automatically assigned to the target person. During a step 110, the new tracklet is added to the reference list as a reference tracklet.

If $PDI_{min} > SR$, then, in a step 112, the distance $PDI_{min}$ is compared to a predetermined human threshold, SH, where SH>SR. For example SH=0.4. If $PDI_{min} > SH$, then the new tracklet is rejected as not belonging to the target object.

In contrast, if in step 112, $PDI_{min} \leq SH$, then the new tracklet can be presented to the operator for validation, during a step 114. If the operator does not validate the new tracklet as belonging to the target person, then the new tracklet is rejected as not belonging to the target object. If, in step 114, the operator validates the new tracklet as belonging to the target person then the new tracklet is added to the reference list as reference tracklet, during step 110.

During step 114, the new tracklet can be presented to the operator individually. Alternatively, in at least one embodiment, the new tracklet can be stored in a tracklet list to be presented to the operator, called validation list. The new tracklets in the validation list can be presented to the operator as a function of at least one of the following parameters:

number of tracklets, denoted NTP, to be presented to the operator at one time, elapsed time, DUR, since the last iteration of the presentation step, and/or number, NMT, of best matches.

For example, when NTP=15 and NMT=3, then the tracking phase 104 is carried out without the presentation step 114 until there are at least 15 tracklets in the validation list. Once the validation list comprises 15 tracklets, the presentation step 114 is carried out. During this presentation step, only the three tracklets which have the best scores, that is to say the smallest distances to the reference tracklets, are presented to the operator. The other tracklets are ignored.

Advantageously, in one or more embodiments, the method 100 further comprises a step 116 of updating the value of the human threshold each time a reference tracklet is added to the reference list. According to at least one embodiment, and without loss of generality, the value of the human threshold SH may be updated according to the following relationship:

$$SH = SH_i - \left\{ NBTR \cdot \left( \frac{SH_i - SR}{NB_{max}} \right) \right\}$$

SH is the value of the human threshold;

$SH_i$ is the initial value of the human threshold, chosen at the start of the method 100;

NBTR is the number of reference tracklets in the reference list;

$NB_{max}$ is the number of reference tracklets in the reference list; and

PA is a predefined training value.

The training value PA can be defined as a function of a maximum number, $NB_{max}$, of reference tracklets in the reference list.

Alternatively, or in addition, the training value PA may be defined as a function of a total training value, denoted D. For example:

$$D \leq (SH_i - SR).$$

According to at least one embodiment, the training value PA can be calculated according to the following relationship:

$$PA = D/NB_{max}$$

According to at least one embodiment:

$$D = SH_i - SR.$$

With SR=0.1, $SH_i$=0.4, as indicated above by way of non-limiting example, we have:

$$SH = 0.4 - \left\{ NBTR \cdot \left( \frac{0.3}{NB_{max}} \right) \right\}$$

Using $NB_{max}$=600 as an example, then $$SH = 0.4 - \left\{ NBTR \cdot \left( \frac{0.3}{600} \right) \right\}$$

Thus, the more the number of reference tracklets increases in the reference list, the more the value of the human threshold SH increases and approaches the value of the re-identification threshold, such that the operator receives fewer requests as the tracking phase progresses.

When the new tracklet is rejected in step 112, since $PDI_{min}$>SH, or when the new tracklet is rejected in step 114 because the operator indicates that the new tracklet does not belong to the target object, the tracking phase may optionally comprise a step 118 of adding the new tracklet to a rejected tracklet list.

In addition, in step 112, when $PDI_{min} \leq SH$, the tracking phase 104 can comprise an optional test step 120, carried out before the presentation step 114. The objective of this test step 120 is to determine whether the new tracklet has a similarity with a previously rejected tracklet.

The test step 120 comprises a step 122 of calculating at least one distance, Euclidean or cosine, called second distance, denoted DDI, between the new tracklet and each tracklet in the rejected tracklet list. Thus, during step 122, for the new tracklet, as many second distances are determined as there are rejected tracklets in the rejected tracklet list. Among these second distances, only the smallest second distance, denoted $DDI_{min}$, is retained.

During a step 124:

the smallest second distance $DDI_{min}$ is compared to the smallest first distance $PDI_{min}$, and the smallest second distance $DDI_{min}$ is compared to a predetermined threshold, referred to as the similarity threshold, denoted SS;

When $DDI_{min}$<$PDI_{min}$ and $DDI_{min}$<SS, then it is assumed that the new tracklet is very similar to one of the tracklets already rejected. In this case, the new tracklet is rejected as not belonging to the target object. The new tracklet can optionally be stored in step 118 in the list of rejected tracklets. In the opposite case, the tracking phase 104 continues to step 114, similarly to what has been described above.

The similarity threshold SS may be of fixed value. The similarity threshold can be fixed at the start of the method according to one or more embodiments of the invention.

Figure 2:
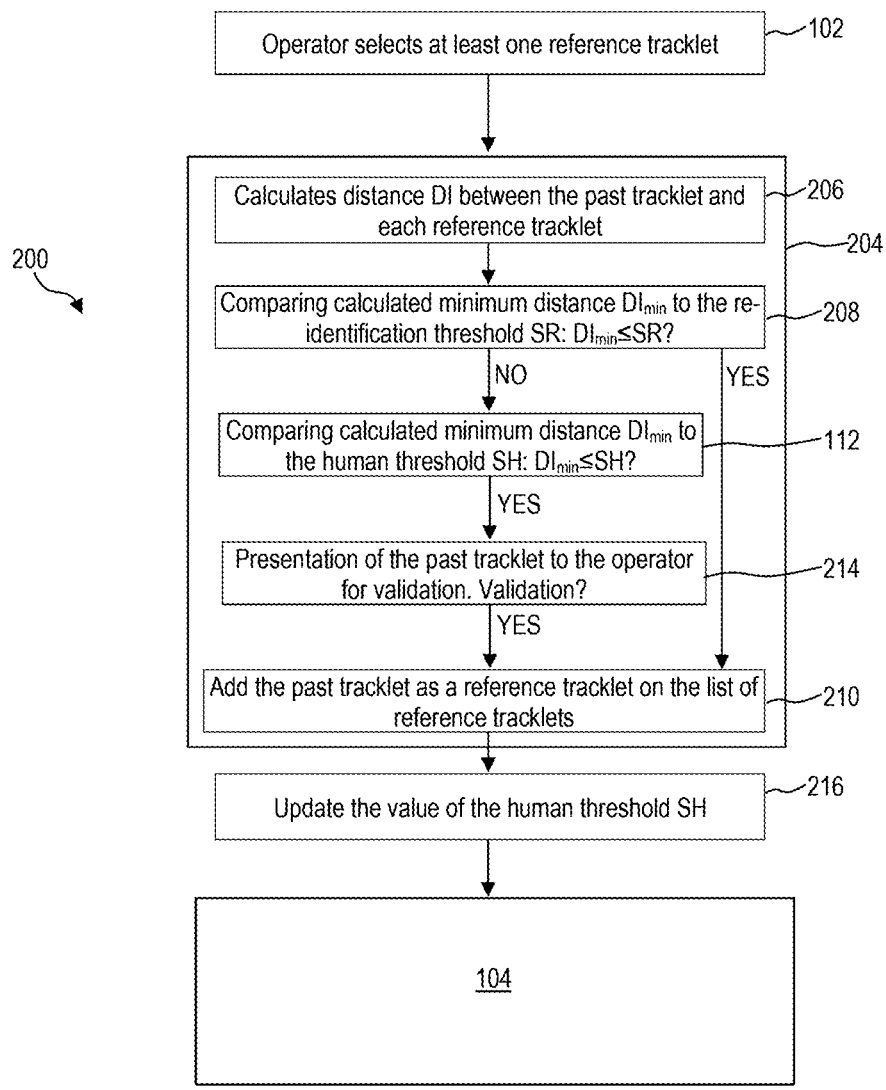
FIG. 2 is a schematic depiction of a method according to one or more embodiments of the invention.

FIG. 2 is a schematic depiction of a method according to one or more embodiments of the invention.

The method 200 of FIG. 2 comprises the step 102 of selecting, by the operator, of at least one reference tracklet corresponding to the target person to be tracked. Preferably, in at least one embodiment, each reference tracklet is obtained from images from one of the cameras captured prior to tracking. Each reference tracklet is stored in a reference tracklet list, also called a reference list.

The method 200 then comprises a phase 204 of enriching the reference list by adding at least one additional reference tracklet to said reference list, chosen from a database of past tracklets acquired during a predetermined period preceding the tracking phase. In other words, the enrichment phase 204 is carried out just before the execution of the tracking phase 104. The past tracklets are those which were acquired by the cameras for a predetermined past period immediately preceding the tracking phase 104. For example, the past period may be 30 minutes or one hour.

The enrichment phase 204 is carried out in turn and individually for each past tracklet, corresponding to a person, and which has been acquired by one of the cameras during the past predetermined period immediately preceding the tracking phase.

The enrichment phase comprises a step 206 calculating, for the past tracklet, a distance, cosine or Euclidean, denoted DI, between said past tracklet and each reference tracklet in the reference list. Among the calculated distances, only the smallest $DI_{min}$ is retained.

During a step 208, the smallest calculated distance $DI_{min}$ in step 208 is compared to the predetermined re-identification threshold SR. For example SR=0.1.

If $DI_{min} \leq SR$, then the past tracklet is automatically assigned to the target person. During a step 210, the past tracklet is added to the list of reference tracklets as a reference tracklet, and enriches the reference list.

If $DI_{min} > SR$, then, in a step 212, the distance $DI_{min}$ is compared to a predetermined human threshold, SH, where SH>SR. For example SH=0.4. If $DI_{min} > SH$, then the past tracklet is rejected.

In contrast, if $DI_{min} \leq SH$, then the past tracklet is presented to the operator for validation, during a step 214. If the operator does not validate the past tracklet as belonging to the target person, then the past tracklet is rejected and the enrichment phase 204 can be carried out for another past tracklet, where appropriate. If the operator validates the past tracklet as belonging to the target person, then the past tracklet is added as the reference tracklet in the reference list during step 210.

The enrichment phase 204 can be reiterated for each past tracklet, as long as past tracklets acquired during the predetermined past period remain.

Thus, the enrichment phase makes it possible to enrich the reference list with one or more past tracklets, from one or more reference tracklets selected by the operator.

The method 200 comprises, after the enrichment phase 204, a step 216 of updating the human threshold as a function of the number of reference tracklets stored in the reference list.

The value of the human threshold may be updated according to any predetermined relationship.

According to at least one embodiment, and without loss of generality, the value of the human threshold can be updated according to the following relationship:

$$SH = SH_i - \left\{ NBTR \cdot \left( \frac{SH_i - SR}{NB_{max}} \right) \right\}$$

SH is the value of the human threshold;
$SH_i$ is the initial value of the human threshold;
NBTR is the number of reference tracklets in the reference list;
$NB_{max}$ is the number of reference tracklets in the reference list; and
PA is a predefined training value.

Step 216 of updating the value of the human threshold SH can be carried out each time that a past tracklet is added to the reference list during the phase 204. Step 216 of updating the human threshold SH can be carried out only once, when all the iterations of the enrichment phase have been carried out and there is no longer any past tracklet to be processed. According to yet another alternative, step 216 of updating the human threshold SH can be carried out at another frequency, for example chosen by the operator.

Optionally, the enrichment phase 204 may comprise a step of storing the past tracklet in a list of rejected past tracklets when it is rejected.

In addition, optionally, the enrichment phase 204 can further comprise a test step, similar to the test step 120, carried out with the previously rejected past tracklets stored in the previously rejected past tracklet list.

The method 200 may further comprise a tracking phase 104, as described above with reference to FIG. 1.

It has been noted that, unlike the method 100 of FIG. 1, the method 200 of FIG. 2 does not comprise step 116 of updating the value of the human threshold SH during tracking.

Figure 3:
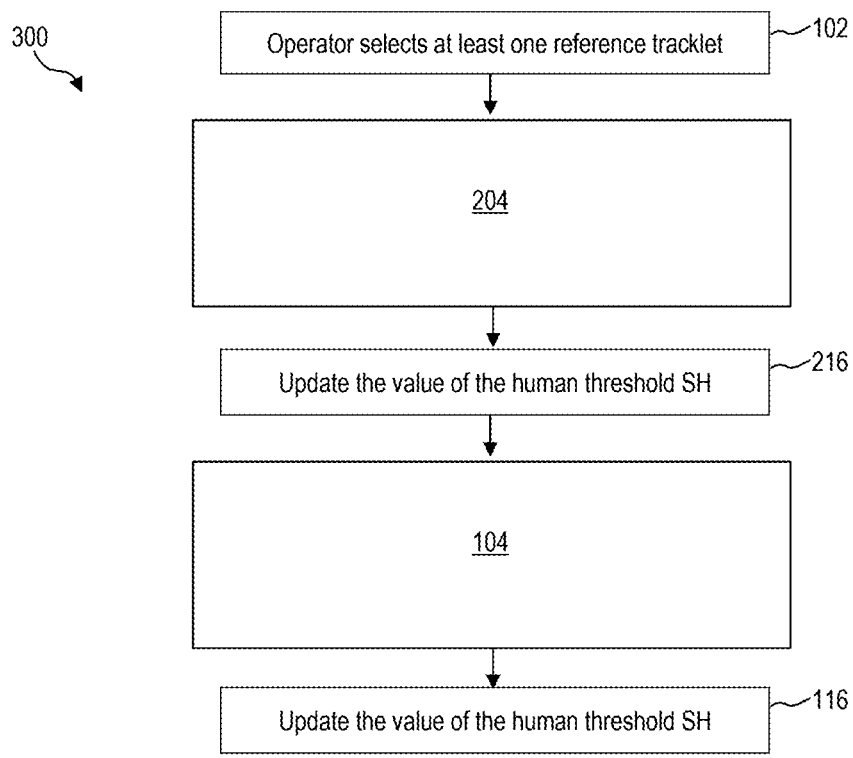
FIG. 3 is a schematic depiction of a method according to one or more embodiments of the invention.

FIG. 3 is a schematic depiction of a method according to one or more embodiments of the invention.

The method 300 of FIG. 3 comprises a combination of methods 100 and 200 of FIGS. 1 and 2. The method 300 comprises step 102, the enrichment phase 204, the step 216 of updating the value of the human threshold SH before the start of tracking, the tracking phase 104, as well as the step 116 of updating the value of the human threshold SH during the tracking.

Figure 4:
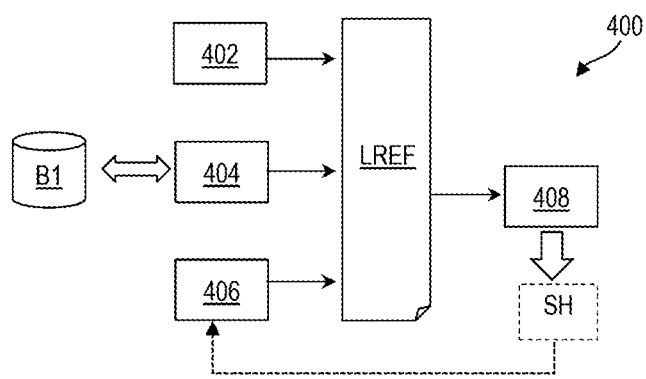
FIG. 4 is a schematic depiction of a device according to one or more embodiments of the invention.

FIG. 4 is a schematic representation of a device according to one or more embodiments of the invention.

The device 400 of FIG. 4 may be used to implement a method for tracking a target object according to at least one embodiment of the invention, and in particular any one of the methods 100, 200 or 300 described above.

The device 400 comprises at least one module 402 for the operator to select at least one reference tracklet. Such a module allows the operator to add one or more reference tracklets to a reference list LREF at the beginning of the method. In particular, the module 402 is configured to implement step 102 described above.

The device 400 comprises at least one module 404 for enriching the reference list LREF from past tracklets stored in a database B1 of past tracklets. In particular, the module 404 is configured to implement the enrichment phase 204 of FIG. 2 or 3.

The device 400 comprises at least one tracking module 406 making it possible to perform a tracking of a target object and, optionally to enrich the reference list LREF each time a new tracklet, corresponding to the target object, is identified. In particular, the module 406 is configured to implement the tracking phase 104 of FIG. 1, 2 or 3.

The device 400 comprises at least one module 408 for updating the value of the human threshold as a function of the number of reference tracklets in the reference list and of a predetermined relationship previously entered. In particular, by way of at least one embodiment, the module 408 is configured to implement at least one, and in particular each, of the updating steps 116 and 216 of FIG. 1, 2, or 3.

At least one of the modules 402-408 may be independent of the other modules 402-408. At least two of the modules 402-408 can be integrated into the same module.

Each module 402-408 can be a hardware module or a software module, such as an application or a computer program, executed by an electronic component of the processor, electronic chip, or computer type, etc.

Figure 5:
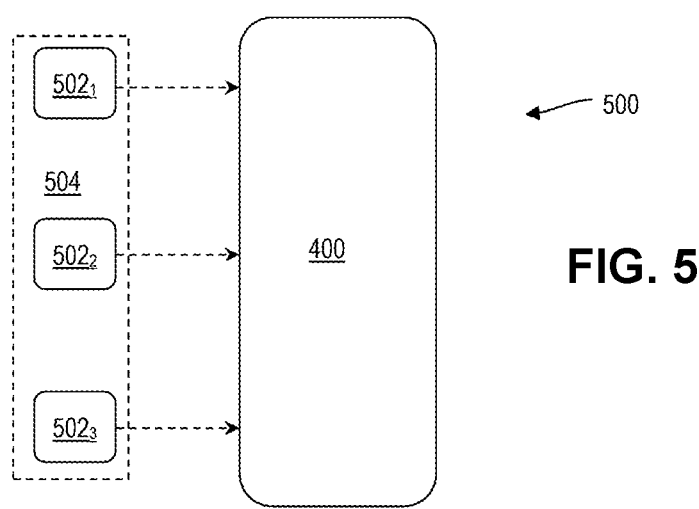
FIG. 5 is a schematic depiction of a system according to one or more embodiments of the invention.

FIG. 5 is a schematic depiction of a tracking system according to one or more embodiments of the invention.

The system 500 may be used to implement a tracking method according to at least one embodiment of the invention, and in particular any one of methods 100, 200 or 300 of FIG. 1, 2, or 3.

The system 500 is used for tracking a target object of any type, and in particular of a target person, from video streams coming from K cameras $502_1$-$502_K$ of said system, distributed in space and forming a network 504 of cameras, with K≥1. In the example shown, and in a not at all limiting manner, K=3.

The system 500 further comprises a tracking device according to at least one embodiment of the invention, such as for example the device 400 of FIG. 4.

The device 400 can be local to the cameras $502_1$-$502_3$ or remote from the cameras $402_1$-$402_3$.

The device 400 can be connected to each of the cameras $502_1$-$502_3$ by a wired or wireless connection.

Of course, the at least one embodiment of the invention is not limited to the examples disclosed above. For example, the number of cameras is not limited to 3. In addition, the threshold values and the number of reference tracklets as well as the different relationships mentioned for the calculation of the human threshold are given as non-limiting examples.

The invention claimed is:

1. A method for real-time multi-camera tracking of a target object from a reference list comprising at least one tracklet belonging to said target object, wherein said at least one tracklet comprises a reference tracklet, said method comprising:
    tracking said target object, carried out for at least one new tracklet captured by at least one camera of a plurality of cameras, said tracking comprising
        calculating at least a first distance between said at least one new tracklet and at least one reference tracklet;
        when a smallest calculated first distance is between a first predetermined threshold comprising a re-identification threshold, and a second predetermined threshold comprising a human threshold, greater than said re-identification threshold, presenting said at least one new tracklet to an operator, for said operator to assign or not assign said at least one new tracklet to said target object, manually;
    wherein the human threshold is a function of a number of reference tracklets in said reference list.

2. The method according to claim 1, wherein, when the smallest calculated first distance is less than the re-identification threshold, the tracking further comprises an automatic assignment of the at least one new tracklet to the target object.

3. The method according to claim 1, wherein, when said at least one new tracklet is assigned to the target object during the tracking, said tracking further comprises adding said at least one new tracklet as a reference tracklet in said reference list.

4. The method according to claim 3, further comprising, before the tracking, a prior phase of enriching the reference list, by adding at least one additional reference tracklet in said reference list, chosen from a database of past tracklets acquired during a predetermined period preceding a triggering of the tracking.

5. The method according to claim 4, wherein the prior phase of enriching the reference list comprises for a past tracklet of said past tracklets, at least one of
    calculating at least one distance between
        the reference tracklet of said reference list, and
        said past tracklet,
    adding, or not adding, said past tracklet as an additional reference tracklet in said reference list as a function of said at least one distance that is calculated, and one or more of the re-identification threshold and the human threshold.

6. The method according to claim 3, further comprising updating a value of the human threshold in an event the reference tracklet is added to said reference list.

7. The method according claim 1, further comprising adjusting one or more of the human threshold and the re-identification threshold, as a function of at least one characteristic of a scene observed by a camera of said at least one camera.

8. The method according to claim 1, wherein said presenting said at least one new tracklet to the operator is carried out according to at least one predetermined rule as a function of at least one of
    a number of tracklets to be presented to the operator at one time,
    elapsed time since a last iteration of the presenting,
    a number of best matches.

9. The method according to claim 1, wherein validation, or not validate, by the operator for a first tracklet is used to validate or not validate a second tracklet following said first tracklet, such that said second tracklet is not presented to the operator.

10. The method according to claim 1, further comprising storing the at least one new tracklet in a rejected tracklet list, when said at least one new tracklet is not assigned to the target object.

11. The method according to claim 1, wherein the tracking further comprises, prior to the presenting the at least one new tracklet to the operator, testing comprising
    calculating at least one second distance between the at least one new tracklet and at least one previously rejected tracklet, and
    rejecting said at least one new tracklet as not belonging to the target object when
        the smallest calculated first distance is greater than the at least one second distance, and
        the at least one second distance is less than a predetermined threshold comprising a similarity threshold.

12. A non-transitory computer program comprising executable instructions which, when executed by a computing apparatus, implement a method for real-time multi-camera tracking of a target object from a reference list comprising at least one tracklet belonging to said target object, wherein said at least one tracklet comprises a reference tracklet, said method comprising:
    tracking said target object, carried out for at least one new tracklet captured by at least one camera of a plurality of cameras, said tracking comprising
        calculating at least a first distance between said at least one new tracklet and at least one reference tracklet;
        when a smallest calculated first distance is between a first predetermined threshold comprising a re-identification threshold, and a second predetermined threshold comprising a human threshold, greater than said re-identification threshold, presenting said at least one new tracklet to an operator, for said operator to assign or not assign said at least one new tracklet to said target object, manually;
    wherein the human threshold is a function of a number of reference tracklets in said reference list.

13. A device for real-time multi-camera tracking of a target object from a reference list comprising at least one tracklet belonging to said target object, wherein said at least one tracklet comprises a reference tracklet, said device comprising:
    a means for tracking said target object, carried out for at least one new tracklet captured by at least one camera of a plurality of cameras, said tracking comprising
        calculating at least a first distance between said at least one new tracklet and at least one reference tracklet;
        when a smallest calculated first distance is between a first predetermined threshold comprising a re-identification threshold, and a second predetermined threshold comprising a human threshold, greater than said re-identification threshold, presenting said at least one new tracklet to an operator, for said operator to assign or not assign said at least one new tracklet to said target object, manually;

wherein the human threshold is a function of a number of reference tracklets in said reference list.

14. The device for real-time multi-camera tracking of a target object according to claim 13, further comprising said plurality of cameras, wherein said means for tracking said target object comprises said tracking of said target object from images provided by said plurality of cameras.

15. The device for real-time multi-camera tracking of a target object according to claim 13, wherein, when the smallest calculated first distance is less than the re-identification threshold, the means for tracking is further configured to automatically assign the at least one new tracklet to the target object.

16. The device for real-time multi-camera tracking of a target object according to claim 13, wherein, when said at least one new tracklet is assigned to the target object during the tracking, said means for tracking is further configured to add said at least one new tracklet as a reference tracklet in said reference list.

17. The device for real-time multi-camera tracking of a target object according to claim 16, further comprising means for enriching the reference list, by adding at least one additional reference tracklet in said reference list, chosen from a database of past tracklets acquired during a predetermined period preceding a triggering of the tracking;

wherein said enriching the reference list comprises for a past tracklet of said past tracklets, at least one of calculating at least one distance between the reference tracklet of said reference list, and said past tracklet, adding, or not adding, said past tracklet as an additional reference tracklet in said reference list as a function of said at least one distance that is calculated, and one or more of the re-identification threshold and the human threshold.

18. The device for real-time multi-camera tracking of a target object according to claim 13, further comprising means for adjusting one or more of the human threshold and the re-identification threshold, as a function of at least one characteristic of a scene observed by a camera of said at least one camera.

19. The device for real-time multi-camera tracking of a target object according to claim 13, wherein said presenting said at least one new tracklet to the operator is carried out according to at least one predetermined rule as a function of at least one of a number of tracklets to be presented to the operator at one time, elapsed time since a last iteration of the presenting, a number of best matches.

20. The device for real-time multi-camera tracking of a target object according to claim 13, wherein the means for tracking is further configured to test, prior to the presenting the at least one new tracklet to the operator, wherein said test comprises calculating at least one second distance between the at least one new tracklet and at least one previously rejected tracklet, and rejecting said at least one new tracklet as not belonging to the target object when the smallest calculated first distance is greater than the at least one second distance, and the at least one second distance is less than a predetermined threshold comprising a similarity threshold.

* * * * *